Nov. 25, 1958
H. G. LASSEN
2,861,811
TRAILER CHASSIS LOWERING MEANS
Filed Dec. 21, 1956
3 Sheets-Sheet 1
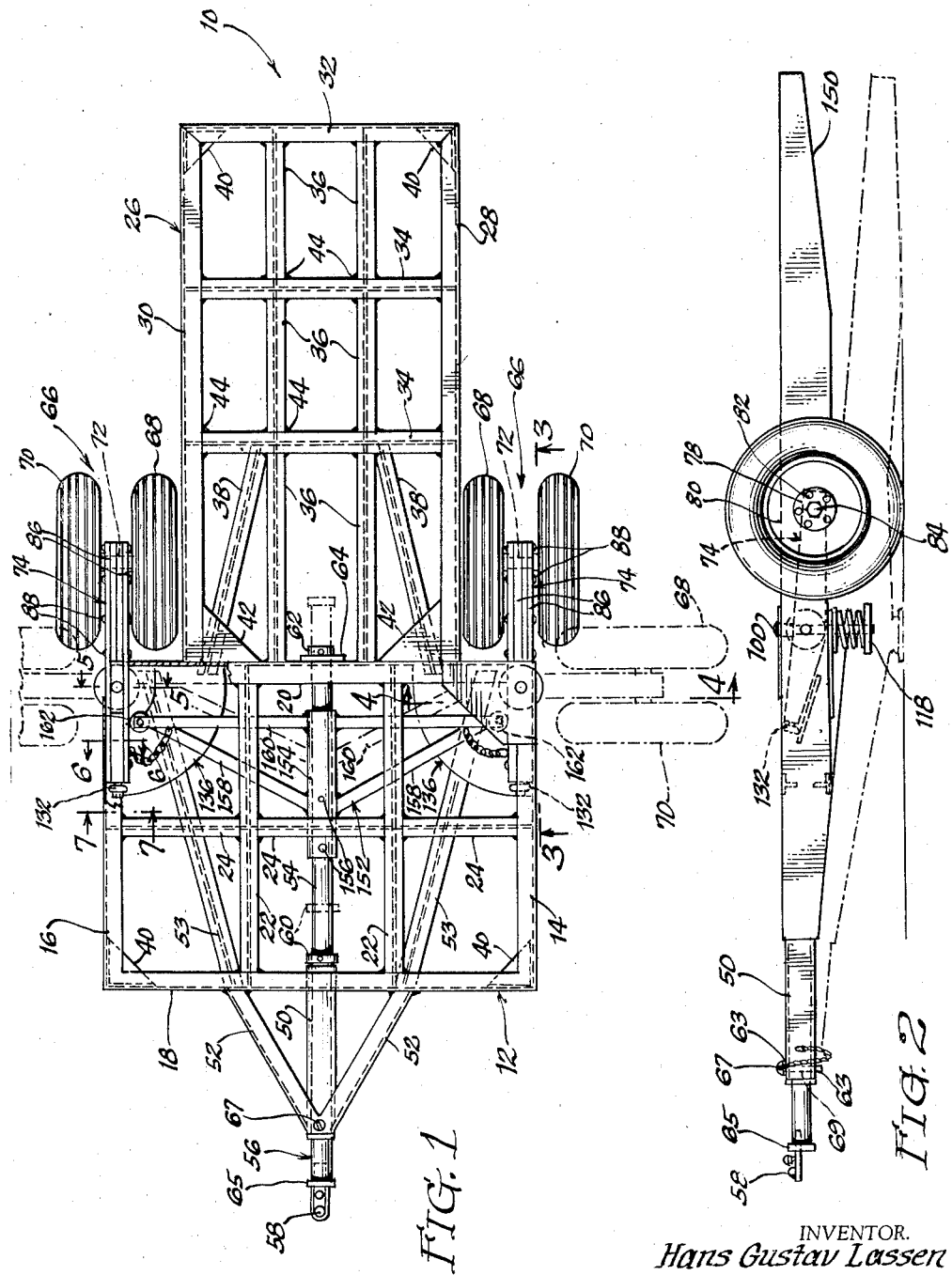
INVENTOR.
Hans Gustav Lassen
BY Horton, Davis,
Brewer & Brugman
Attorney Nov. 25, 1958 H. G. LASSEN 2,861,811
TRAILER CHASSIS LOWERING MEANS
Filed Dec. 21, 1956 3 Sheets-Sheet 2
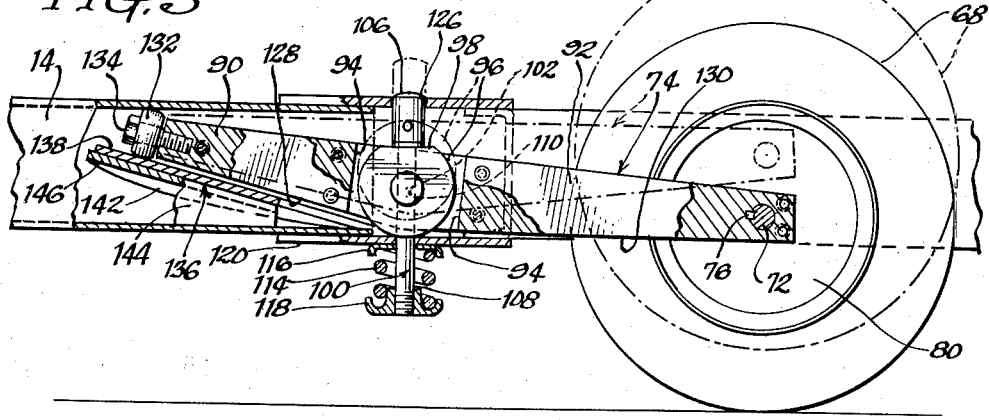
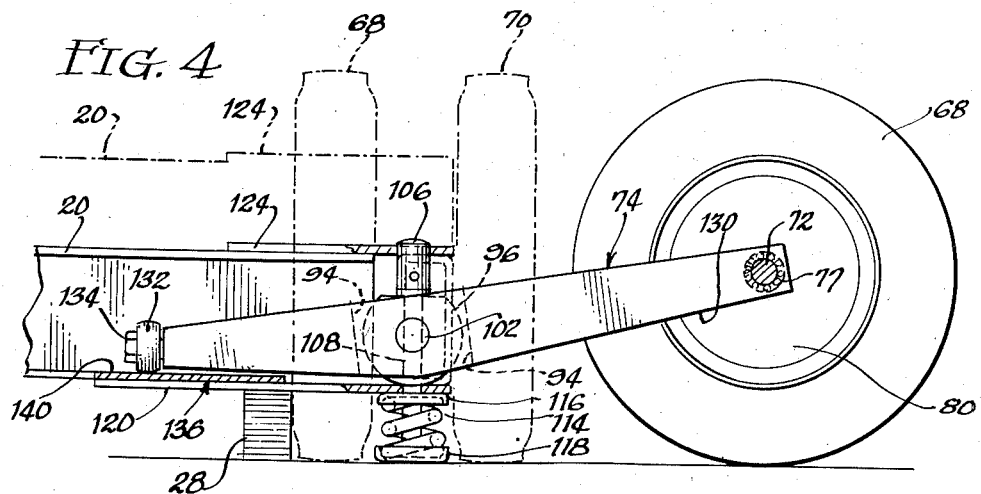
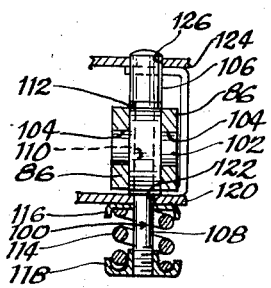
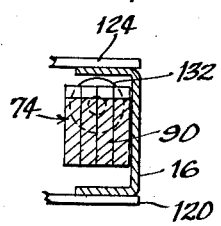
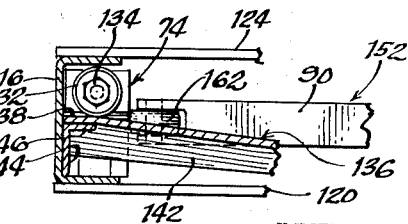
INVENTOR.
Hans Gustav Lassen
BY Horton, Davis,
Brewer & Brugman
Attorneys

United States Patent Office 2,861,811
Patented Nov. 25, 1958

2,861,811

TRAILER CHASSIS LOWERING MEANS

Hans Gustav Lassen, Chicago, Ill., assignor of one-third to Herbert R. Lewis, Oak Park, and one-third to Adolph E. Hulcher, Verden, Ill.

Application December 21, 1956, Serial No. 629,980

15 Claims. (Cl. 280—43)

The present invention relates to suspension mechanism for wheel supported land vehicles such as commercial trailers of the type in which the trailer is adapted to be pulled or towed by a motor vehicle for moving the trailer from place to place, as well as being rendered immobile for unloading purposes. Specifically, the invention is concerned with a resilient spring loaded suspension mechanism for vehicles of this type wherein the spring or springs associated with the mechanism will normally serve as a cushioning means for the load when the trailer is in transit and also wherein such spring or springs may be rendered ineffective at will so that it or they will no longer support the load whereupon at least a portion of the trailer chassis will be lowered to the ground due to lack of support, thus removing the load from the trailer wheels so that the trailer floor will be at ground level at its rear and the trailer will become immobile against lateral forces in any direction whatsoever, as for example against the normal lateral forces which are invariably incident to loading and unloading operations.

The objects of the invention are manifold and, principal among them is the provision of a suspension means of the character briefly outlined above wherein such lowering of the trailer chassis is automatically effected upon release of a locking device by the operator of the vehicle, by the simple expedient of propelling the towing motor vehicle a predetermined short distance in a backward direction. A similar and related object of the invention is to provide a suspension means of this sort wherein subsequent elevation of the trailer chassis is effected automatically by propelling the towing motor vehicle a predetermined short distance in a forward direction.

Another object of the invention, in a suspension means of this character, is to provide a chassis lowering means which operates to gradually relieve the normal cushioning force of the spring or springs associated with the mechanism so that gradual lowering of the chassis to the ground from its elevated position will take place, thus avoiding undue shock to the chassis and the load supported thereby.

A still further object of the invention is to provide a suspension mechanism for trailers including individual but identical suspension means for the wheel or wheel assemblies on each side of the trailer wherein such means operate indendently of the other to cushion the distributed load on that side of the vehicle when the trailer is being drawn in transit, but in which the two suspension means operate in conjunction with each other and simultaneously to lower the end of the trailer chassis to the ground for unloading purposes. A related object is to provide dual suspension means of this character wherein such simultaneous operation of the suspension means during lowering operations takes place without the use of any positively connected links between the various parts of the two suspension means.

Yet another object of the invention is to provide a suspension mechanism having associated therewith a novel form of locking means whereby the chassis lowering mechanism associated therewith may be rendered ineffective to lower the chassis during reverse movement of the draft vehicle.

Other objects and advantages of the invention, not at this time enumerated, will become readily apparent as the nature of the invention is better understood.

In the accompanying three sheets of drawings forming a part of this specification, two illustrative embodiments of the invention have been shown.

In these drawings:

Fig. 1 is a top plan view of a trailer chassis construction showing the improved suspension means operatively applied thereto, the trailer chassis being shown in its fully elevated position and the position of the trailer wheels when the trailer chassis is in its lowered position being shown in dotted lines;

Fig. 2 is a side elevational view of the structure shown in Fig. 1 with the wheels shown in parallel position;

Fig. 3 is an enlarged sectional view taken substantially along the line 3—3 of Fig. 1;

Fig. 4 is a sectional view taken substantially along the line 4—4 of Fig. 1 but with the parrts in the position which they assume when the trailer is in its lowered position;

Fig. 5 is a sectional view taken substantially along the line 5—5 of Fig. 1;

Fig. 6 is a sectional view taken substantially along the line 6—6 of Fig. 1;

Fig. 7 is a sectional view taken substantially along the line 7—7 of Fig. 1.

Figure 8:
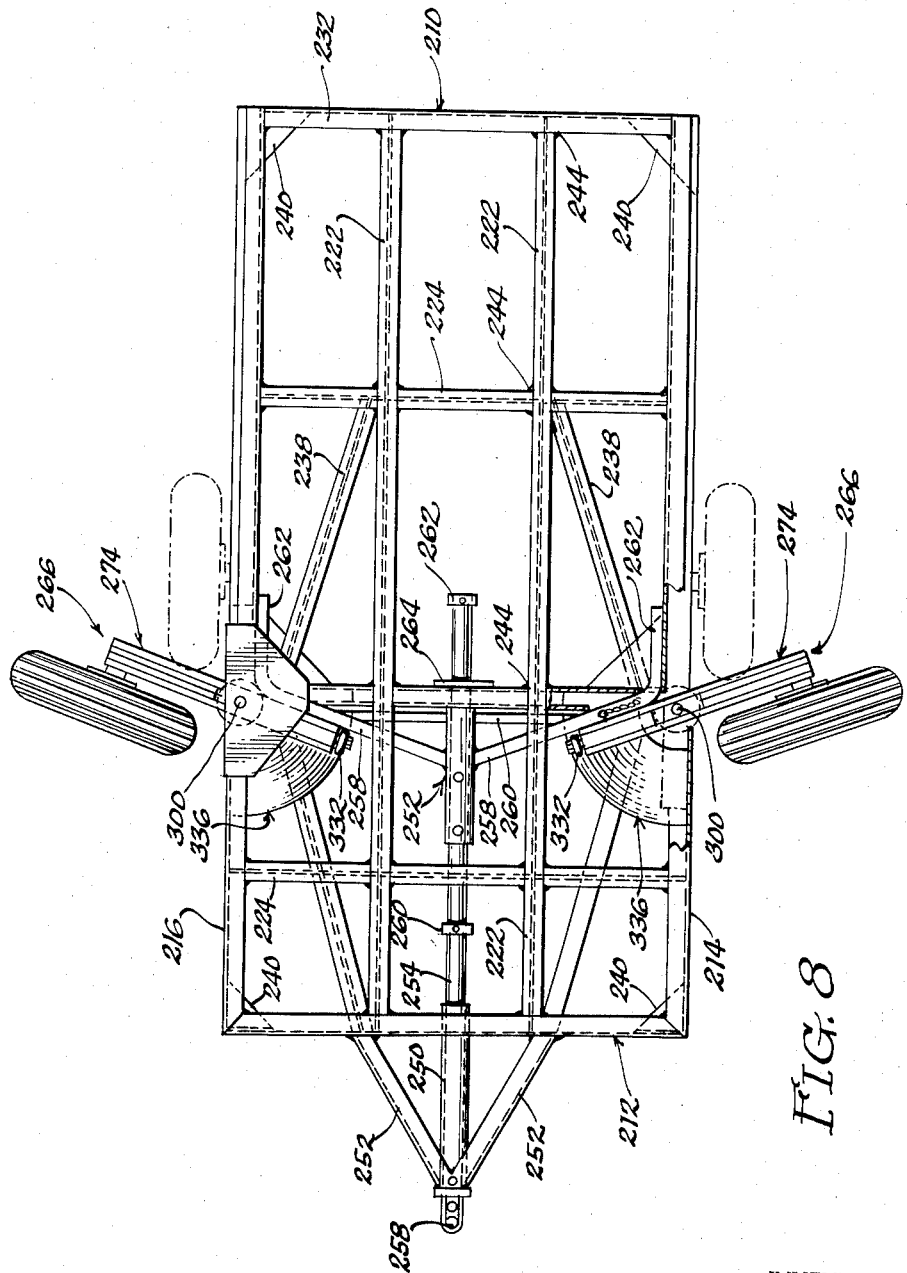
Fig. 8 is a plan view similar to Fig. 1, showing a modified form of suspension means applied thereto.

Referring now to the drawings in detail and in particular to Figs. 1 and 2, a trailer frame or chassis is designated in its entirety at 10 and may be of any suitable construction for application thereto of a trailer body (not shown). The trailer chassis 10 is designed for attachment at its front end to the rear end of a motor vehicle by means of which the trailer may be drawn. The chassis 10 involves in its general organization a comparatively wide forward generally rectangular frame part 12 having inwardly opening side frame members 14 and 16 of channel-shape configuration, front and rear transverse members 18 and 20 respectively, likewise of channel-shape construction, intermediate longitudinal frame members 22, and medial transverse strut members 24 extending between the adjacent frame members 14, 16 and 22. The chassis 10 further includes a rear frame section or part 26 which is somewhat longer and narrower than the part 12 and which includes channel side members 28 and 30, a rear channel member 32, intermediate transverse members 34 which extend between the side members 28 and 30, and longitudinal strut members 36 extending between the adjacent transverse members 34 and 32. The forward ends of the members 28 and 30 are secured to the rear member 20 of the frame part 12, and additional longitudinal strut members 36 extend between the rear member 20 and the foremost transverse member 34. A pair of diagonal struts 38 connect the rear frame member 20 and the foremost transverse member 34. Reinforcing and strengthening gusset plates 40 are provided at the front and rear corners of the entire frame assembly 10 and additional gusset plates 42 are provided at the corners of the rear frame part existing at the juncture between the two longitudinal members 28 and 30 and the transverse member 20. The various frame members described above are suitably secured to one another in any desired manner as, for example, by welding as indicated at 44.

Secured to the front transverse member 18 at the center thereof and projecting forwardly therefrom is a tubular guide sleeve 50 which may be of cylindrical configuration. The sleeve 50 passes through the vertical web portion of the channel-shape member 18 and is welded in position on the member with the extreme rear end region of the sleeve projecting a slight distance rearwardly of the member. The forward region of the sleeve 50 is centered in position by a yoke consisting of diverging arms 52, the forward ends of which are secured to the forward end of the tube 50 and the rear ends of which are secured to the member 18. Additional bracing for frame 12 is provided by angularly disposed struts 53 secured at their ends to members 18 and 20 and at their central regions to strut members 24.

The tube 50 has slidably mounted therein an elongated rod or tube 54 which constitutes one element of a combined locking carriage and tow rod assembly designated in its entirety at 56 and the locking function of which will be set forth in detail presently. The tube 54 per se constitutes a tow rod by means of which the trailer chassis 10 may be attached to and pulley by the motor vehicle and, accordingly, the forward end of the tube 54 forwardly of the sleeve 50 is provided with a conventional socket connection 58 which constitutes the female element of a ball and socket connection, the counterpart of which is in the form of a ball hitch (not shown) suitably supported on the towing motor vehicle. The tube 54 extends rearwardly of the sleeve 50 and has its rear end regions slidably supported in the web portion of the rear transverse member 20 of the front frame section 12. The tube 54 is effective to transmit the forward pulling motion of the motor vehicle to the trailer chassis 10 when the tube is in its forward full line position as shown in Fig. 1 and, accordingly, a pair of stop collars 60 and 62, the former being positioned medially on the tube and the latter being positioned at the extreme rear end of the tube, are secured to the tube, the collar 60 being designed for engagement with the rear end of the guide sleeve 50 and the collar 62 being designed for engagement with a thrust-plate 64 through which the tube 54 extends and which is secured to the web portion of the channel member 20. A thrust collar 65 carried at the forward end of the tow tube 54 is designed for engagement with the forward end of the guide sleeve 50 during trailer chassis lowering operations as will appear presently. A locking pin 67, is adapted to be dropped through aligned openings 63 in the tube 54 and sleeve 50 to maintain the tube 54 in an extended towing position. A chain connects the pin 67 to the sleeve 50 and prevents inadvertent loss of the pin.

Still referring to Figs. 1 and 2, and additionally to Fig. 3, the trailer chassis 10 is supported or suspended at its sides in the medial longitudinal regions thereof on or from a pair of wheel and axle assemblies, each of which has been designated in its entirety at 66, each assembly consisting of a dual wheel arrangement including inner and outer wheels 68 and 70, respectively, mounted on a common axle 72 at the opposite ends thereof. Each axle is carried adjacent the free end of a composite supporting bar 74 yieldably mounted for both rocking movement about a horizontal axis and turning movement about a vertical axis at one side of the chassis framework in a manner and for a purpose that will appear presently. The specific manner of mounting the wheels 68 and 70 on their axle 72 forms no part of the present invention and, for illustrative purposes, the axle 72 is shown as being in the form of a stub axle which is keyed as at 76 (Fig. 3) in the rear or free end of the supporting bar 74 and on the opposite ends of which the two wheels are independently and rotatably mounted by means of tapered roller bearings 77 (Fig. 4) or the like, the wheels 68 and 70 being of the disk type and including hub portions 78 from which the wheel bodies 80 are removable by means of suitable bolts 82 or the like. The hub portions are maintained in position on the axles 72 by means of removable nuts 84. It will be understood of course that other mountings than that shown and described herein may be employed and if desired the wheels may be fixedly secured to rotating axles suitably journalled in the rear end of the supporting bar 74.

Each composite supporting bar 74 is comprised of a plurality of steel strips or laminations 86 (Figs. 1, 5 and 6) which are riveted as at 88 or otherwise secured together in face-to-face relationship. The two outer side strips 86 are full length strips while the intermediate strips consist of front and rear strip sections 90 and 92, respectively (Fig. 3), which are spaced longitudinally of the bar 74 so as to provide in effect a medial vertical slot 94 which extends completely through the bar and within which slot there is mounted for limited rocking or pivotal movement about a horizontal axis a vertically movable hub plate 96 of generally circular disk-like configuration having its periphery relieved as at 98 to provide a flat side or edge surface. The plate 96 is slidably mounted on a vertically extending pin 100 and has integral transverse rock shafts 102 (Fig. 5) which extend across the slot 94 and the ends of which are rotatably mounted within aligned openings 104 formed in the side strips 86. As shown in Fig. 3, the pin 100 is formed with an enlarged head 106 and a reduced shank or stem portion 108. The head 106 is normally maintained seated against a collar 112, which surrounds the stem portion 108 and bears against the flat surface 98, by means of a coil spring 114 surrounding the stem portion 108 and effectively bearing at its ends against respective cups 116 and 118, the former cup bearing against the underneath side of a lower gusset plate 120 welded or otherwise secured to the side frame member 14 or 16 as the case may be, and to the transverse member 20, and the latter cup being threadedly received on the lower end of the pin 100. The shank portion 108 of the pin 100 projects through an opening 122 formed in the plate 120 and is slidable therein. An upper plate 124 overlies the side frame member 14 or 16 and the transverse member 20, and is welded thereto and is formed with an opening 126 therein through which the head 106 slidably extends. The pin 100 is thus slidable in the two plates 120 and 124 and is normally maintained in a retracted lowered position with the hub plate 96 having its periphery seated on the lower plate 120 as shown in full lines in Fig. 3.

As shown in Figs. 3 and 4, the composite supporting bars 74 are each in the form of cantilever members having oppositely directed arms on opposite sides of the slot 94 which present underneath surfaces 128 and 130 respectively which are inclined with respect to each other at a wide obtuse angle which, in the illustrated form of the invention is approximately 160°. The supporting bar 74 is movable relative to the chassis framework 10 from the normal position shown in Fig. 3 wherein the chassis is in its elevated position with the surface 130 adjacent the lower plate 120, to various angular positions, one of which is shown in dotted lines in Fig. 3 and is the result of road shocks and the like acting through the wheels 68 and 70 and axle 72 on the rear end of the composite bar 74 whereby the latter is caused to swing about a horizontal axis passing transversely through its forward end in a manner that will be set forth subsequently. The supporting bar 74 is also capable of swinging movement about the axis of the vertical pin 100 from a normal position wherein it extends longitudinally of the chassis frame 10 to an extended position as shown in dotted lines in Fig. 1 and in full lines in Fig. 4 for trailer chassis lowering purposes as will also be described presently.

Referring now to Figs. 1, 3 and 7, the forward end of the composite supporting bar 74 carries a traction roller 132 mounted for rotation on a stud 134 threadedly received in the end of the bar. The roller 132 is designed for tractional engagement with a generally spiral ramp plate 136 of approximately 90° extent. The upper end of the ramp plate 136 is formed with a flat inclined land surface or ledge portion 138 while the lower end thereof is formed with a flat horizontal land surface or ledge portion 140 (Fig. 4), the two surfaces 138 and 140 being connected by a spiral inclined intermediate ramp surface proper 142. The upper end region of the ramp plate is welded to the channel-shaped side frame member 14 or 16 as the case may be, and additionally, if desirable or necessary, by a generally triangular supporting plate having a vertical flange 144 welded to the web portion of the channel frame member and an inclined flange 146 which underlies the ledge portion 138 and to which the latter is welded and on which it is supported. The spiral body portion 142 extends inwardly of the chassis frame and the lower ledge portion 140 is secured as by welding to the upper face of the plate 120 and is supported thereby.

As previously stated, the supporting bars 74 are each tiltable about the horizontal axis passing through the forward end of the bar under the influence of any road shocks which may be applied to the wheel assembly 66 carried thereby, which is to say that the bar 74 is capable of being elevated bodily, when road shocks are encountered, by a pivotal movement about the point of contact between the roller 132 and the land area 138 of the ramp plate 136 on which the roller rests when the chassis is in its elevated position. During such movement of the supporting bar 74, the medial regions thereof are raised from the level of the lower supporting plate 120 as shown in dotted lines in Fig. 3 and the circular hub plate 96 is caused to move upwardly, thus carrying the guide pin 100 upwardly therewith and causing the spring 114 to become compressed against the underneath side of the plate 120 so as to assimilate the force of the road shock. The lower cup member 118 is adjustable on the pin 100 as previously described and by thus adjusting the tension of the spring, the supporting bar 74 may assume a floating position under the trailer load wherein it clears the lower plate 120 entirely and assumes an intermediate position with the circular guide plate 96 assuming a free floating position between the upper and lower plates 124 and 120 respectively.

The various wheels 68 and 70 of the wheel assemblies 66 may be given the usual camber accorded such wheels so that upon initial backward rolling movement thereof the tendency will be for the wheel assemblies to follow outwardly curved paths of motion on the ground or other supporting surface, thus carrying with them the composite supporting bars 74 which are caused to swing outwardly relative to the chassis frame side bars 14 and 16. During such swinging movement of the bars 74, the surfaces 128 (Fig. 3) of the forward portions of the bars 74 will traverse or sweep over the inclined portions 142 of the ramp plates 136 and the rollers 132 will move from the upper ledge portions 138 of the plates and descend the inclined ramp surfaces 142 and come to rest on the lower ledge portions 140 thereof with the supporting bars 74 extending laterally at right angles to the longitudinal axis of the chassis frame 10. Such turning movement of the bars 74 will be limited by the vertical web portion of the transverse frame member 20 against which the sides of the supporting bars 74 will abut.

Inasmuch as the supporting surface for the wheel assemblies 66 serves as a reaction member for these assemblies, such lowering of the forward end of the bars 74 will cause a proportionate lowering of the intermediate regions of these bars. In other words, the comparatively large increments of downward motion applied to the forward ends of the supporting bars 74 will be reflected by proportionately diminished increments of downward motion being applied to the pivotal regions of the bars according to second class leverage principles, whereupon the bars will rock about the axes of the horizontal pins 102 (Figs. 4 and 5) and ease any tension which may exist in the springs 114 while at the same time lowering the chassis to the dotted line position shown in Fig. 2 or the full line position shown in Fig. 4. In order that the extreme rear end of the chassis frame may find an effective seat upon the ground or other supporting surface, the rear end regions of the side frame members may have their underneath surfaces tapered as indicated at 150 in Fig. 2 at an angle calculated to bring these surfaces flush with the ground when the chassis is lowered in the manner described above.

Elevation of the trailer chassis 10 is accomplished by moving the motor vehicle forwardly whereupon the tube 54 will slide forwardly through the sleeve 50 until such time as the collars 60 and 62 engage the rear end of the guide sleeve 50 and the thrust plate 64 respectively and transmit the forward motion of the tube 54 to the trailer chassis 10. Thereafter the wheels will swing toward the sides 26 and 30 as the trailer is pulled forwardly until they assume the position shown in Fig. 1.

In order to prevent unwanted lowering of the trailer chassis 10 during normal backing up movements of the motor vehicle and its attached trailer chassis, the tow tube 54 carries in its medial regions a locking carriage or frame 152 (Figs. 1 and 7) including an elongated collar or sleeve 154 which is secured by bolts 156 to the tube 54 and from which there extends a pair of outwardly and rearwardly inclined struts 158, the free ends of which are connected to a pair of transversely disposed and oppositely extending thrust rods or bars 160 having rollers 162 mounted on the extreme outer ends thereof. The locking carriage is shiftable with the tow tube 54 from an advanced position wherein the two rollers 162 bear against the inner sides of the composite supporting bars 74 forwardly of the vertical guide pins 100 and serve to maintain or lock the supporting bars 74 in their fore-and-aft longitudinal positions, to retracted positions wherein the rollers 162 are disposed rearwardly of the guide pins 100 so that the supporting bars 74 are released for lateral swinging movement upon backing up movements of the trailer chassis 10 as previously described.

It will be observed that during trailer-elevating operations as previously described, relative movement of the tow-tube 54 forwardly through the sleeve 50 will bring the two rollers 162 into camming engagement with the transversely extending faces of the adjacent supporting bars 74 so as to forcibly assist the normal tractional action of the wheel assemblies in bringing these assemblies to their normal forward rolling positions on the ground or other supporting surface.

In the form of the invention shown in Fig. 8, which is well adapted for use where trailer frames of light construction are concerned, the arrangement of the trailer chassis frame 10 remains substantially the same as in the form of the invention shown in Figs. 1 to 7 inclusive. Likewise, the construction of the tow tube, guide sleeve and spring suspension means for the wheel assemblies has not been appreciably altered. Here, however, the dual wheel constructions 66 have been replaced by single wheel assemblies as indicated at 266. In order to avoid needless repetition of description, wherever possible similar reference numerals of a higher order have been applied to the corresponding parts in the two illustrated forms of the invention.

The use of single wheel assemblies 266 permits closer nesting of the wheel assemblies in the trailer frame 210 and thus the rear portion of the framework assumes the full width of the forward portion thereof. In this latter form of the invention, the rollers 162 at the outer ends of the thrust arms 160 have been omitted and in their stead there have been substituted a pair of rearwardly extending cam shoes 262 which are formed as integral extensions on the strut members 258. Otherwise the essential features of the invention shown in Figs. 1 to 7 inclusive have been preserved. The cam shoes 262 serve the same locking function as the rollers 162 in the other form of the invention in that they move with the carriage assembly 252 between retracted positions of release wherein they lie wholly rearwardly of the pivot or guide pins 300 and advanced locking positions wherein the major portions thereof, at least, lie forwardly of these guide pins so as to maintain the supporting bars 274 in their fore-and-aft longitudinal positions.

Although this invention has been described with reference to its application to a two-wheel trailer, it is apparent that it may be readily applied to a four-wheel trailer and with slight modification to a four-wheel front drive vehicle. It is understood therefore that the scope of this invention is not to be limited to the embodiment described above, but is to be determined by the appended claims.

I claim.

1. In a suspension mechanism for supporting a vehicle chassis having longitudinally extending frame members, in combination, a supporting bar pivotally mounted medially of its ends on each frame member for swinging movement about a vertical axis and movable between a retracted position wherein the bar extends longitudinally of the frame member to which it is pivoted and an extended position wherein the rear portion of the bar extends laterally outwardly of said frame member at a right-angle thereto, said supporting bar also being mounted for limited rocking movement about a horizontal axis passing through said vertical axis, a wheel assembly including a supporting wheel carried at the extreme rear end of said supporting bar, antifriction means mounted on the extreme forward end of said supporting bar, a spiral ramp plate fixedly secured to said frame member and underlying said antifriction means and of a curvature conforming to the circular sweep of said antifriction means when said supporting bar is swung in either direction about said vertical axis, said ramp plate having an elevated portion against which said antifriction means bears when the supporting bar is in its retracted position, a lower portion against which said antifriction means bears when the supporting bar is in its extended position, and an intermediate inclined ramp portion connecting said elevated and lower portions.

2. The combination set forth in claim 1, wherein means are provided on the chassis for releasably locking the supporting bar in its retracted position.

3. In a suspension mechanism for supporting a chassis, the combination set forth in claim 1 wherein said antifriction means is in the form of a roller mounted on the forward end of said supporting bar for rotation about the longitudinal axis of the bar.

4. In a suspension mechanism for supporting a chassis having longitudinally extending frame members connected by transverse frame members, in combination, a supporting bar pivotally mounted medially of its ends on each longitudinally extending frame member at transversely opposed positions on the chassis for swinging movement about a vertical axis and movable between a retracted position wherein the bar extends longitudinally of the side frame member to which it is pivoted and an extended position wherein the rear portion of the bar extends laterally outwardly of said frame member at a right angle thereto, said bar also being mounted for limited rocking movement about a horizontal axis passing through said vertical axis, a wheel assembly including a supporting wheel carried at the rear end of said bar, antifriction means mounted on the forward end of said supporting bar, a spiral ramp plate underlying said antifriction means and of a curvature conforming to the circular sweep of said antifriction means when the bar is swung in either direction about said vertical axis, said ramp plate having an elevated portion at one end thereof fixedly secured to said side frame member, a lower portion at the other end thereof fixedly secured to one of said transverse frame members and an intermediate portion connecting said elevated and lower portions, and means for releasably locking said bar in its retracted position.

5. In a suspension mechanism for supporting a chassis having longitudinally extending side frame members which are channel-shaped in cross section with the web portions thereof extending in a vertical plane and with the open sides thereof presented inwardly of the chassis, in combination, a supporting bar pivotally mounted medially of its ends within each side frame member for swinging movement about a vertical axis and movable between a retracted position wherein the bar extends longitudinally of the side frame member and is wholly disposed within the lateral vertical confines of the latter and an extended position wherein the rear portion of the bar extends laterally outwardly of said frame member at a right angle thereto, said supporting bar also being mounted for limited rocking movement about a horizontal axis passing through said vertical axis, a wheel assembly including a supporting wheel carried at the rear end of said bar, an antifriction roller mounted on the forward end of said bar, a spiral ramp plate fixedly secured to said frame member and underlying said antifriction roller and of a curvature conforming to the circular sweep of the roller when the bar is swung in either direction about said vertical axis, said ramp plate having an elevated portion against which the roller bears when the bar is in its retracted position, a lower portion against which the roller bears when the bar is in its extended position and an intermediate inclined ramp portion connecting said elevated and lower portions, and means for releasably locking said bar in its retracted position.

6. In a suspension mechanism for supporting a chassis, the combination set forth in claim 5 wherein said locking means comprises a member movably mounted on the chassis between a retracted inoperative position wherein it is out of the paths of movement of said bars to an advanced operative position wherein it is interposed between the forward portions of said bars and in the paths of movement of the latter to prevent the inward swinging movements thereof incident to the outward swinging movements of the rear portions of said bars.

7. In a suspension mechanism for supporting a trailer chassis having longitudinally extending side frame members which are channel-shaped in cross section with the web portions thereof extending in vertical planes and with the open sides thereof presented inwardly of the chassis, in combination, a pair of supporting bars each having a traction wheel rotatably mounted on one end and a supporting roller mounted on the other end, means for pivotally mounting each supporting bar within one of the frame members for swinging movement about a vertical axis medially of said ends and for limited rocking movement about a horizontal axis passing transversely through said vertical axis whereby the bar is movable between a retracted position wherein the forward portion thereof is wholly confined between the channel sides of the frame member and the bar extends longitudinally of the member to an extended position wherein the rear portion of the bar extends outwardly of the frame member and the forward portion thereof extends inwardly of the frame member, both at a right angle to the frame member, said pivotal mounting means comprising a guide pin vertically disposed extending between the sides of said channel-shaped frame member, a hub plate through which said guide pin extends and on which the plate is vertically slidable and about the axis of which the plate is rotatable, said bar being pivoted medially of its ends to said hub plate for rocking movement thereon about a vertical axis, spring means effectively bearing at one end against said frame member and at its other end against said hub plate for normally urging the latter downwardly within the channel-shaped frame member, a spiral ramp plate fixedly secured to said frame member and underlying said roller and of a curvature conforming to the circular sweep of the roller when the bar is swung in either direction about said vertical axis, said ramp plate having an elevated portion against which the roller bears downwardly when the bar is in its retracted position, a lower portion against which the roller bears when the bar is in its extended position and an intermediate inclined ramp portion connecting said elevated and lower portion, and means for releasably locking said bar in its retracted position.

8. In a suspension mechanism for supporting a trailer chassis, the combination set forth in claim 7 wherein said guide pin projects downwardly through the lower side of said channel-shaped frame member and wherein said spring means comprises a collar on the lower projecting end of said guide pin, and a coil spring surrounding the pin and effectively bearing at one end against said collar and at its other end against the underneath side of said lower side of frame member.

9. In a suspension mechanism for supporting a trailer chassis, the combination set forth in claim 7 wherein said supporting bar is formed with a medial slot therein in which the hub plate is disposed.

10. In a suspension mechanism for supporting a trailer chassis having longitudinally extending side frame members connected by transverse frame members, in combination, a supporting bar pivotally mounted medially of its ends on each side frame member at transversely opposed positions on the chassis for swinging movement about a vertical axis and movable between a retracted position wherein the bar extends longitudinally of the side frame member to which it is pivoted and an extended position wherein the rear portion of the bar extends laterally outwardly of the frame member and the front portion thereof extends laterally inwardly of the frame member, said bar also being mounted for limited rocking movement about a horizontal axis passing through said vertical axis, a wheel assembly including a supporting wheel carried at the rear end of said supporting bar, a roller mounted on the forward end of said bar, a spiral ramp plate underlying said roller and designed for engagement with the latter when said supporting wheel is on a traction surface in rolling engagement therewith, said ramp plate having a curvature conforming to the circular sweep of said roller when the bar is swung in either direction about siad vertical axis, said ramp plate having an elevated portion at one end thereof on which the roller rests when the supporting bar is in its retracted position, a lower portion at its other end on which the roller rests when the bar is in its extended position, and an intermediate inclined portion connecting said end portions, a tow member extending longitudinally and centrally of said chassis and slidably mounted on at least two of said transverse frame members for longitudinal sliding movement relative to the chassis, a locking bar fixedly mounted on said tow member and extending transversely thereof, said tow member being movable between a rear inoperative position wherein the ends of said locking bar are out of the paths of movement of said supporting bars to a forward operative position wherein they are respectively in said paths of movement, and a thrust member on said tow member engagable with one of said transverse frame members when the former is in its forward position.

11. In a suspension mechanism for supporting a trailer chassis having longitudinally extending side frame members connected by transverse frame members, in combination, a supporting bar pivotally mounted medially of its ends on each side frame member at transversely opposed positions on the chassis for swinging movement about a vertical axis and movable between a retracted position wherein the bar extends longitudinally of the side frame member to which it is pivoted and an extended position wherein the rear portion of the bar extends laterally outwardly of the frame member and the front portion thereof extends laterally inwardly of the frame member, said bar also being mounted for limited rocking movement about a horizontal axis passing through said vertical axis, a wheel assembly including a supporting wheel carried at the rear end of said supporting bar, a roller mounted on the forward end of said bar, a spiral ramp plate underlying said roller and designed for engagement with the latter when said supporting wheel is on a traction surface in rolling engagement therewith, said ramp plate having a curvature conforming to the circular sweep of said roller when the bar is swung in either direction about said vertical axis, said ramp plate having an elevated portion at one end thereof on which the roller rests when the supporting bar is in its retracted position, a lower portion at its other end on which the roller rests when the bar is in its extended position, and an intermediate inclined portion connecting said end portion, a tow member extending longitudinally and centrally of said chassis and slidably mounted on the same for longitudinal sliding movement relative thereto, a locking bar fixedly secured to said tow member and extending transversely thereof, rollers carried at the opposite ends of said locking bar respectively, said tow member being movable between a retracted rear inoperative position wherein said rollers are disposed rearwardly of the vertical pivotal axes of said supporting bars and out of the paths of movement of the latter and an advanced forward operative position wherein they are disposed in the paths of inward sweeping movement of the forward portions of the bars respectively, and a thrust member on said tow member engageable with a portion of said chassis when said tow rod is in its advanced position for transmitting the pulling force of the tow member to said chassis.

12. In a suspension mechanism for supporting a trailer chassis, the combination set forth in claim 11 including, additionally, means for releasably locking said tow member in its advanced forward operative position against rearward shifting movement thereof on the chassis.

13. In a suspension mechanism for supporting a trailer chassis, the combination set forth in claim 12 wherein said releasable locking means comprises cooperating holes which are formed in a portion of the chassis framework and in said tow member and movable into vertical register when the tow member is moved to its advanced position, and a locking pin capable of being loosely inserted into said holes when the latter are in register.

14. In a suspension mechanism for supporting a trailer chassis having longitudinally extending side frame members connected by transverse frame members, in combination, a supporting bar pivotally mounted medially of its ends on each side frame member at transversely opposed positions on the chassis for swinging movement about a vertical axis and movable between a retracted position wherein the bar extends longitudinally of the side frame member to which it is pivoted and an extended position wherein the rear portion of the bar extends laterally outwardly of the frame member and the front portion thereof extends laterally inwardly of the frame member, said bar also being mounted for limited rocking movement about a horizontal axis passing through said vertical axis, a wheel assembly including a supporting wheel carried at the rear end of said supporting bar, a roller mounted on the forward end of said bar, a spiral ramp plate underlying said roller and designed for engagement with the latter when said supporting wheel is on a traction surface in rolling engagement therewith, said ramp plate having a curvature conforming to the circular sweep of said roller when the bar is swung in either direction about said vertical axis, said ramp plate having an elevated portion at one end thereof on which the roller rests when the supporting bar is in its retracted position, a lower portion at its other end on which the roller rests when the bar is in its extended position, and an intermediate inclined portion connecting said end portions, a guide sleeve mounted on said chassis and extending along the central axis of the latter adjacent the forward end of the same, a tow tube slidable in said guide sleeve, a locking bar fixedly secured to said tow tube and extending transversely thereof, a roller carried at each end of said locking bar, said tow tube being movable between a retracted rear inoperative position wherein said locking bar rollers are disposed rearwardly of the vertical pivotal axes of the supporting bars and out of the paths of movement of the latter and an advanced forward operative position wherein the locking bar rollers are disposed in the paths of inward movement of the forward portions of the bars respectively, a thrust collar on said tow tube engageable with the rear end of said guide sleeve when said tow tube is in its advanced forward position for transmitting the forward pulling force of the tow tube to the chassis, and means for releasably locking said tow tube in its advanced operative position against rearward shifting movement thereof.

15. In a suspension mechanism for supporting a vehilce chassis having rigid frame members, in combination, a wheel assembly and a wheel assembly mounting bar pivotally mounted on each frame member for swinging movement about a substantially vertical axis and movable between a retracted position wherein the wheel is behind the pivot and a laterally extended position wherein the wheel is alongside the pivot, said supporting bar being mounted also for rocking movement about a horizontal axis, said wheel assembly including a vehicle supporting wheel carried at the rear of the bar, load-carrying means mounted at the forward regions of the bar, a ramp on a frame member and underlying the load-carrying means in all positions of the said means as the bar is swung about its substantially vertical axis, said ramp having an elevated portion against which the said means bears when the bar is in its retracted position, a lower portion against which the said means bears when the bar is in its extended position, and an intermediate portion connecting the elevated and lower portions for transferring the said means between the lower and upper portions.

References Cited in the file of this patent

UNITED STATES PATENTS 2,774,612     Evans _____ Dec. 18, 1956